United States Patent
Shamul et al.

(10) Patent No.: US 10,333,977 B1
(45) Date of Patent: Jun. 25, 2019

(54) DECEIVING AN ATTACKER WHO IS HARVESTING CREDENTIALS

(71) Applicant: ILLUSIVE NETWORKS LTD., Tel Aviv (IL)

(72) Inventors: Tomer Shamul, Jerusalem (IL); Tsahi Lasry, Na'ale (IL); Moshe Segev, Ramat Yishay (IL); Mor Natan, Tel Aviv (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 16/109,811

(22) Filed: Aug. 23, 2018

(51) Int. Cl.
*H04L 29/06* (2006.01)
(52) U.S. Cl.
CPC ................................. *H04L 63/1491* (2013.01)
(58) Field of Classification Search
CPC .................................................... H04L 63/1491
See application file for complete search history.

(56) References Cited

U.S. PATENT DOCUMENTS

| | | |
|---|---|---|
| 6,363,489 B1 | 3/2002 | Comay et al. |
| 6,618,709 B1 | 9/2003 | Sneeringer |
| 7,065,657 B1 | 6/2006 | Moran |
| 7,089,589 B2 | 8/2006 | Chefalas et al. |
| 7,093,291 B2 | 8/2006 | Bailey |
| 7,516,227 B2 | 4/2009 | Cohen |
| 7,574,741 B2 | 8/2009 | Aviani et al. |
| 7,636,944 B2 | 12/2009 | Raikar |
| 7,665,134 B1 | 2/2010 | Hernacki et al. |
| 7,694,339 B2 | 4/2010 | Blake et al. |
| 7,725,937 B1 | 5/2010 | Levy |
| 7,752,664 B1 | 7/2010 | Satish et al. |
| 7,945,953 B1 | 5/2011 | Salinas et al. |
| 8,015,284 B1 | 9/2011 | Isenberg et al. |

(Continued)

FOREIGN PATENT DOCUMENTS

| | | |
|---|---|---|
| WO | 2006131124 A1 | 12/2006 |
| WO | 2015001969 A1 | 1/2015 |
| WO | 2015047555 A1 | 4/2015 |

OTHER PUBLICATIONS

Wikipedia, Active Directory, https://en.wikipedia.org/wiki/Active_Directory, Jun. 24, 2015.

(Continued)

*Primary Examiner* — Nelson Giddins
(74) *Attorney, Agent, or Firm* — Soquel Group I.P Ltd.

(57) ABSTRACT

A system for deceiving an attacker who harvests credentials within an enterprise network, including a management server deploying a deceptive agent on an endpoint computer of the enterprise network, the deceptive agent including a hook manager creating system hooks on resources in the endpoint computer that holds valuable credentials, which would be desired by attackers, and a deceptive content provider, generating deceptive content and returning the deceptive content to a malicious process run by an attacker on the endpoint computer, the malicious process making a read request directed to a resource in the endpoint computer that holds valuable credentials, thus making it appear to the attacker that a response is coming from the resource whereas in fact the response is coming from the deceptive agent, when the hook manager hooks the read request.

9 Claims, 12 Drawing Sheets

(56) References Cited

U.S. PATENT DOCUMENTS

| | | | |
|---|---|---|---|
| 8,181,249 B2 | 5/2012 | Chow et al. | |
| 8,181,250 B2 * | 5/2012 | Rafalovich | H04L 63/1491 |
| | | | 713/187 |
| 8,250,654 B1 | 8/2012 | Kennedy et al. | |
| 8,375,447 B2 | 2/2013 | Amoroso et al. | |
| 8,499,348 B1 | 7/2013 | Rubin | |
| 8,528,091 B2 | 9/2013 | Bowen et al. | |
| 8,549,642 B2 | 10/2013 | Lee | |
| 8,549,643 B1 | 10/2013 | Shou | |
| 8,719,938 B2 | 5/2014 | Chasko et al. | |
| 8,739,281 B2 | 5/2014 | Wang et al. | |
| 8,739,284 B1 | 5/2014 | Gardner | |
| 8,769,684 B2 | 7/2014 | Stolfo et al. | |
| 8,819,825 B2 | 8/2014 | Keromytis et al. | |
| 8,826,400 B2 * | 9/2014 | Amaya Calvo | H04L 63/1441 |
| | | | 726/6 |
| 8,856,928 B1 | 10/2014 | Rivner et al. | |
| 8,881,288 B1 | 11/2014 | Levy et al. | |
| 8,925,080 B2 | 12/2014 | Hebert | |
| 9,009,829 B2 | 4/2015 | Stolfo et al. | |
| 9,043,905 B1 | 5/2015 | Allen et al. | |
| 9,124,622 B1 | 9/2015 | Falkowitz et al. | |
| 9,152,808 B1 | 10/2015 | Ramalingam et al. | |
| 9,240,976 B1 | 1/2016 | Murchison | |
| 9,325,728 B1 | 4/2016 | Kennedy et al. | |
| 9,356,942 B1 | 5/2016 | Joffe | |
| 9,386,030 B2 | 7/2016 | Vashist et al. | |
| 9,495,188 B1 | 11/2016 | Ettema et al. | |
| 2002/0066034 A1 | 5/2002 | Schlossberg et al. | |
| 2002/0194489 A1 | 12/2002 | Almogy et al. | |
| 2003/0084349 A1 | 5/2003 | Friedrichs et al. | |
| 2003/0110396 A1 | 6/2003 | Lewis et al. | |
| 2003/0145224 A1 | 7/2003 | Bailey | |
| 2004/0088581 A1 | 5/2004 | Brawn et al. | |
| 2004/0128543 A1 | 7/2004 | Blake et al. | |
| 2004/0148521 A1 | 7/2004 | Cohen et al. | |
| 2004/0160903 A1 | 8/2004 | Gai et al. | |
| 2004/0172557 A1 | 9/2004 | Nakae et al. | |
| 2004/0255155 A1 | 12/2004 | Stading | |
| 2005/0114711 A1 | 5/2005 | Hesselink et al. | |
| 2005/0132206 A1 | 6/2005 | Palliyil et al. | |
| 2005/0149480 A1 | 7/2005 | Deshpande | |
| 2005/0235360 A1 | 10/2005 | Pearson | |
| 2006/0010493 A1 | 1/2006 | Piesco et al. | |
| 2006/0041761 A1 | 2/2006 | Neumann et al. | |
| 2006/0069697 A1 | 3/2006 | Shraim et al. | |
| 2006/0101516 A1 | 5/2006 | Sudaharan et al. | |
| 2006/0161982 A1 | 7/2006 | Chari et al. | |
| 2006/0224677 A1 | 10/2006 | Ishikawa et al. | |
| 2006/0242701 A1 | 10/2006 | Black et al. | |
| 2007/0028301 A1 | 2/2007 | Shull et al. | |
| 2007/0039038 A1 * | 2/2007 | Goodman | H04L 63/1408 |
| | | | 726/2 |
| 2007/0157315 A1 | 7/2007 | Moran | |
| 2007/0192853 A1 | 8/2007 | Shraim et al. | |
| 2007/0226796 A1 | 9/2007 | Gilbert et al. | |
| 2007/0299777 A1 | 12/2007 | Shraim et al. | |
| 2008/0016570 A1 | 1/2008 | Capalik | |
| 2008/0086773 A1 | 4/2008 | Tuvell et al. | |
| 2008/0155693 A1 | 6/2008 | Mikan et al. | |
| 2009/0019547 A1 | 1/2009 | Palliyil et al. | |
| 2009/0144827 A1 | 6/2009 | Peinado et al. | |
| 2009/0222920 A1 | 9/2009 | Chow et al. | |
| 2009/0241173 A1 * | 9/2009 | Troyansky | G06F 21/552 |
| | | | 726/5 |
| 2009/0241191 A1 | 9/2009 | Keromytis et al. | |
| 2009/0241196 A1 | 9/2009 | Troyansky et al. | |
| 2009/0328216 A1 | 12/2009 | Rafalovich et al. | |
| 2010/0058456 A1 | 3/2010 | Jajodia et al. | |
| 2010/0071051 A1 | 3/2010 | Choyi et al. | |
| 2010/0077483 A1 | 3/2010 | Stolfo et al. | |
| 2010/0082513 A1 | 4/2010 | Liu | |
| 2010/0251369 A1 | 9/2010 | Grant | |
| 2010/0269175 A1 | 10/2010 | Stolfo et al. | |
| 2011/0016527 A1 | 1/2011 | Yanovsky et al. | |
| 2011/0154494 A1 | 6/2011 | Sundaram et al. | |
| 2011/0167494 A1 | 7/2011 | Bowen et al. | |
| 2011/0214182 A1 | 9/2011 | Adams et al. | |
| 2011/0258705 A1 | 10/2011 | Vestergaard et al. | |
| 2011/0302653 A1 | 12/2011 | Frantz et al. | |
| 2011/0307705 A1 | 12/2011 | Fielder | |
| 2012/0005756 A1 | 1/2012 | Hoefelmeyer et al. | |
| 2012/0084866 A1 * | 4/2012 | Stolfo | G06F 21/554 |
| | | | 726/25 |
| 2012/0167208 A1 | 6/2012 | Buford et al. | |
| 2012/0210388 A1 | 8/2012 | Kolishchak | |
| 2012/0246724 A1 | 9/2012 | Sheymov et al. | |
| 2012/0311703 A1 | 12/2012 | Yanovsky et al. | |
| 2013/0061055 A1 | 3/2013 | Schibuk | |
| 2013/0086691 A1 | 4/2013 | Fielder | |
| 2013/0212644 A1 | 8/2013 | Hughes et al. | |
| 2013/0227697 A1 | 8/2013 | Zandani | |
| 2013/0263226 A1 | 10/2013 | Sudia | |
| 2013/0333040 A1 * | 12/2013 | Diehl | G06F 9/46 |
| | | | 726/24 |
| 2014/0082730 A1 | 3/2014 | Vashist et al. | |
| 2014/0101724 A1 | 4/2014 | Wick et al. | |
| 2014/0115706 A1 | 4/2014 | Silva et al. | |
| 2014/0201836 A1 | 7/2014 | Amsler | |
| 2014/0208401 A1 | 7/2014 | Balakrishnan et al. | |
| 2014/0237599 A1 | 8/2014 | Gertner et al. | |
| 2014/0259095 A1 | 9/2014 | Bryant | |
| 2014/0298469 A1 | 10/2014 | Marion et al. | |
| 2014/0310770 A1 | 10/2014 | Mahaffey | |
| 2014/0337978 A1 | 11/2014 | Keromytis et al. | |
| 2014/0359708 A1 | 12/2014 | Schwartz | |
| 2014/0359769 A1 * | 12/2014 | Sabin | G06F 21/554 |
| | | | 726/23 |
| 2015/0007326 A1 | 1/2015 | Mooring et al. | |
| 2015/0013006 A1 | 1/2015 | Shulman et al. | |
| 2015/0047032 A1 | 2/2015 | Hannis et al. | |
| 2015/0074750 A1 | 3/2015 | Pearcy et al. | |
| 2015/0074811 A1 | 3/2015 | Capalik | |
| 2015/0096048 A1 | 4/2015 | Zhang et al. | |
| 2015/0101044 A1 * | 4/2015 | Martin | G06F 21/552 |
| | | | 726/22 |
| 2015/0128246 A1 | 5/2015 | Feghali et al. | |
| 2015/0156211 A1 | 6/2015 | Chi Tin et al. | |
| 2015/0264062 A1 * | 9/2015 | Hagiwara | G06F 21/56 |
| | | | 726/24 |
| 2015/0326587 A1 | 11/2015 | Vissamsetty et al. | |
| 2015/0326598 A1 | 11/2015 | Vasseur et al. | |
| 2016/0019395 A1 | 1/2016 | Ramalingam et al. | |
| 2016/0080414 A1 | 3/2016 | Kolton et al. | |
| 2016/0212167 A1 | 7/2016 | Dotan et al. | |
| 2016/0261608 A1 | 9/2016 | Hu et al. | |
| 2016/0300227 A1 | 10/2016 | Subhedar et al. | |
| 2016/0308895 A1 | 10/2016 | Kotler et al. | |
| 2016/0323316 A1 | 11/2016 | Kolton et al. | |
| 2016/0373447 A1 | 12/2016 | Akiyama et al. | |
| 2017/0032130 A1 | 2/2017 | Joseph Durairaj et al. | |
| 2018/0176251 A1 * | 6/2018 | Belikovetsky | H04L 63/1491 |

OTHER PUBLICATIONS

Wikpedia, Apple Filing Protocol, https://en.wikipedia.org/wiki/Apple_Filing_Protocol, Aug. 14, 2015.

Wikipedia, DMZ (computing), https://en.wikipedia.org/wiki/DMZ_(computing), Jun. 17, 2015.

Wikipedia, Domain Name System, https://en.wikipedia.org/wiki/Domain_Name_System, Jul. 14, 2015.

Wikipedia, Firewall (computing), https://en.wikipedia.org/wiki/Firewall_(computing), Jul. 14, 2015.

Wikipedia, Honeypot (computing), https://en.wikipedia.org/wiki/Honeypot_(computing), Jun. 21, 2015.

Wikipedia, Kerberos (protocol), https://en.wikipedia.org/wiki/Kerberos_(protocol), Jun. 30, 2015.

Wikipedia, Lightweight Directory Access Protocol, https://en.wikipedia.org/wiki/Lightweight_Directory_Access_Protocol, Aug. 15, 2015.

Wikipedia, LM hash, https://en.wikipedia.org/wiki/LM_hash, Jun. 8, 2015.

(56) References Cited

OTHER PUBLICATIONS

Wikipedia, RADIUS, https://en.wikipedia.org/wiki/RADIUS, Aug. 16, 2015.
Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, https://en.wikipedia.org/wiki/Security_information_and_event_management, Jun. 23, 2015.
Wikipedia, Tarpit (networking), https://en.wikipedia.org/wiki/Tarpit_(networking), Jul. 3, 2014.
Mishra et al., Intrusion detection in wireless ad hoc networks, IEEE Wireless Communications, Feb. 2004, pp. 48-60.
Zhang et al., Intrusion detection techniques for mobile wireless networks, Journal Wireless Networks vol. 9(5), Sep. 2003, pp. 545-556, Kluwer Academic Publishers, the Netherlands.
U.S. Appl. No. 15/004,904, Office Action, dated May 27, 2016, 16 pages.
U.S. Appl. No. 15/004,904, Notice of Allowance, dated Oct. 19, 2016, 13 pages.
U.S. Appl. No. 15/175,048, Notice of Allowance, dated Oct. 13, 2016, 17 pages.
U.S. Appl. No. 15/175,050, Office Action, dated Aug. 19, 2016, 34 pages.
U.S. Appl. No. 15/175,050, Office Action, dated Nov. 30, 2016, 31 pages.
U.S. Appl. No. 15/175,050, Notice of Allowance, dated Mar. 21, 2017, 13 pages.
U.S. Appl. No. 15/175,052, Office Action, dated Feb. 13, 2017, 19 pages.
U.S. Appl. No. 15/175,052, Office Action, dated Jun. 6, 2017, 19 pages.
U.S. Appl. No. 15/175,054, Notice of Allowance, dated Feb. 21, 2017, 13 pages.
U.S. Appl. No. 15/403,194, Office Action, dated Feb. 28, 2017, 13 pages.
U.S. Appl. No. 15/403,194, Notice of Allowance, dated Jun. 16, 2017, 9 pages.
U.S. Appl. No. 15/406,731, Notice of Allowance, dated Apr. 20, 2017.
PCT Application No. PCT/IL16/50103, International Search Report and Written Opinion, dated May 26, 2016, 9 pages.
PCT Application No. PCT/IL16/50579, International Search Report and Written Opinion, dated Sep. 30, 2016, 7 pages.
PCT Application No. PCT/IL16/50581, International Search Report and Written Opinion, dated Nov. 29, 2016, 10 pages.
PCT Application No. PCT/IL16/50582, International Search Report and Written Opinion, dated Nov. 16, 2016, 11 pages.
PCT Application No. PCT/IL16/50583, International Search Report and Written Opinion, dated Dec. 8, 2016, 10 pages.
U.S. Appl. No. 15/175,052, Notice of Allowance, dated Jan. 2, 2018, 9 pages.
U.S. Appl. No. 15/679,180, Notice of Allowance, dated Mar. 26, 2018, 14 pages.
U.S. Appl. No. 15/722,351, Office Action, dated Mar. 9, 2018, 17 pages.
U.S. Appl. No. 15/722,351, Notice of Allowance, dated Aug. 8, 2018, 8 pages.
U.S. Appl. No. 15/682,577, Notice of Allowance, dated Jun. 14, 2018, 15 pages.
U.S. Appl. No. 15/641,817, Office Action, dated Jul. 26, 2018, 29 pages.

* cited by examiner

DECEIVING AN ATTACKER WHO IS HARVESTING CREDENTIALS

CROSS REFERENCES TO RELATED APPLICATIONS

The contents of the following of applicant's US patent applications are hereby incorporated herein in their entireties.

U.S. patent application Ser. No. 15/722,351, entitled SYSTEM AND METHOD FOR CREATION, DEPLOYMENT AND MANAGEMENT OF AUGMENTED ATTACKER MAP, and filed on Oct. 2, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. patent application Ser. No. 15/403,194, now U.S. Pat. No. 9,787,715, entitled SYSTEM AND METHOD FOR CREATION, DEPLOYMENT AND MANAGEMENT OF AUGMENTED ATTACKER MAP, and filed on Jan. 11, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. patent application Ser. No. 15/004,904, now U.S. Pat. No. 9,553,885, entitled SYSTEM AND METHOD FOR CREATION, DEPLOYMENT AND MANAGEMENT OF AUGMENTED ATTACKER MAP, and filed on Jan. 23, 2016 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

FIELD OF THE INVENTION

The present invention relates to computer security, and in particular to preventing attackers from harvesting credentials from an enterprise network.

BACKGROUND OF THE INVENTION

Reference is made to FIG. 1, which is a simplified diagram of a prior art organization network 100 connected to an external internet 10. Network 100 is shown generally with resources including endpoint computers 110, databases 120, switches and routers 130, and mobile devices 140 such as smart phones and tablets, for ease of presentation, although it will be appreciated by those skilled in the art that organization networks today are generally much more complex and include other devices such as printers, other types of network elements such as relays, and any Internet of Things objects. The various connections shown in FIG. 1 may be direct or indirect, wired or wireless communications, or a combination of wired and wireless connections. Endpoint computers 110 and databases 120 may be physical elements or logical elements, or a mix of physical and logical elements. Endpoint computers 110 and databases 120 may be virtual machines. Endpoint computer 110 and databases 120 may be local, remote or cloud-based elements, or a mix of local, remote and cloud-based elements. Endpoint computers 110 may be client workstation computers, or server computers including inter alia file transfer protocol (FTP) servers, email servers, structured query language (SQL) servers, secure shell (SSH) servers and other application servers, or a mix of client and server computers. An organization's information technology (IT) department manages and controls network 100 in order to serve the organization's requirements and meet the organization's needs.

Access to endpoint computers 110 and databases 120 in network 100 may optionally be governed by an access governor 150, such as a directory service, that authorizes users to access endpoint computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing endpoint computers 110 and databases 120 include inter alia server account credentials such as <address> <username> <password> for an FTP server, an SQL server, or an SSH server. Credentials for accessing endpoint computers 110 and databases 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Background information about the Kerberos protocol and the LM hash is available at Wikipedia.

Access governor 150 may maintain a directory of endpoint computers 110, databases 120 and their users. Access governor 150 authorizes users and computers, assigns and enforces security policies, and installs and updates software. When a user logs into an endpoint computer 110, access governor 150 checks the submitted password, and determines if the user is an administrator (admin), a normal user (user) or other user type.

Endpoint computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between organization network 100 and external internet 10. Firewall 180 controls incoming and outgoing traffic for network 100. Background information about firewalls and DMZ is available at Wikipedia.

One of the most prominent threats that organizations face is a targeted attack; i.e., an individual or group of individuals that attacks the organization for a specific purpose, such as leaking data from the organization, modifying data and systems, and sabotaging data and systems.

Targeted attacks are carried out in multiple stages, typically including inter alia reconnaissance, penetration, lateral movement and payload. Lateral movement involves establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, organization structure, and implemented security solutions, and then operates in accordance with that data. One method to defend against such attacks is to plant misleading information/decoys/bait with the aim that the attacker learns of their existence and consumes those bait resources, which are monitored so as to notify an administrator of malicious activity. In order to monitor usage of deceptive information, trap servers, referred to as "honeypots", are deployed in the organization. Background information about honeypots is available at Wikipedia.

Attackers generally harvest credentials from endpoint computers 110 of network 100, and then perform lateral movements within network 100. Conventional honeypot solutions have several drawbacks. Specifically, deceptive data planted in network resources is static, and may thus be visible and confusing to legitimate users. Conventional deceptive data may be triggered by legitimate user activity, thus triggering false positive events. Conventional deceptive data has large fingerprints.

SUMMARY

Embodiments of the present invention overcome drawbacks of conventional honeypot solutions by generating deceptive data that is only visible to an attacker. As such, legitimate user activity is unaffected by the deceptive data. Furthermore, there is a very high likelihood that triggering of deceptive data is done by an attacker, thus minimizing false positives.

Embodiments of the present invention install deceptive agents on endpoint computers of an enterprise network. The deceptive agents hook resources of the endpoint computers that contain valuable credentials, such as registries and file systems, and respond to attempts, by a malicious process being run by an attacker on an endpoint computer, to read from these resources by generating and returning deceptive content. The deceptive content is inter alia IP addresses, hostnames and user credentials that point to trap servers.

The deceptive agents may install hooks on network adaptors of endpoint computers, to monitor outgoing remote calls.

Alternative embodiments of the present invention install deceptive agents on remote servers of the enterprise. The deceptive agents monitor inbound requests to the remote servers and authenticate the requests to ensure that they originate from legitimate client processes.

There is thus provided in accordance with an embodiment of the present invention a system for deceiving an attacker who harvests credentials within an enterprise network, including a management server deploying a deceptive agent on an endpoint computer of the enterprise network, the deceptive agent including a hook manager creating system hooks on resources in the endpoint computer that holds valuable credentials, which would be desired by attackers, and a deceptive content provider, generating deceptive content and returning the deceptive content to a malicious process run by an attacker on the endpoint computer, the malicious process making a read request directed to a resource in the endpoint computer that holds valuable credentials, thus making it appear to the attacker that a response is coming from the resource whereas in fact the response is coming from the deceptive agent, when the hook manager hooks the read request.

There is additionally provided in accordance with an embodiment of the present invention a method for deceiving an attacker who is harvesting credentials within an enterprise network, including deploying, by a management server, a deceptive agent on an endpoint computer of an enterprise network, creating, by the deceptive agent, system hooks on resources in the endpoint computer that hold valuable credentials, which would be desired by attackers, and in response to hooking a read request, by a malicious process being run by an attacker on the endpoint computer, directed to a resource in the endpoint computer that holds valuable credentials, generate, by the deceptive agent, deceptive content and respond to the read request by returning the deceptive content to the malicious process, thus making it appear to the attacker that the response is coming from the resource whereas in fact the response is coming from the deceptive agent.

There is further provided in accordance with an embodiment of the present invention a method for deceiving an attacker who is harvesting credentials within an enterprise network, including deploying, by a management server, a deceptive agent on a remote server of an enterprise network, wherein the deceptive agent listens to inbound requests for the remote server and authenticates the inbound requests as coming from a legitimate client computer of the enterprise network, and in response to detecting a remote call to a service of the remote server from a malicious process being run by an attacker on a client computer of the enterprise network, generate, by the deceptive agent, deceptive content and respond to the remote call by returning the deceptive content to the malicious process, thus making it appear to the attacker that the response is coming from the service in the remote server whereas in fact the response is coming from the deceptive agent.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

TABLE I

Elements in the FIGS.

| Element | Description |
| --- | --- |
| 10 | Internet |
| 100 | enterprise network |
| 110 | endpoint computer |
| 120 | network databases |
| 130 | network switches and routers |
| 140 | mobile devices |
| 150 | access governor (optional) |
| 160 | STEM server |
| 170 | DNS server |
| 180 | firewall |
| 200 | enterprise network with deceptive agent modules |
| 210 | management server |
| 211 | policy manager |
| 212 | forensic application |
| 213 | deployer |
| 230 | policies database |
| 240 | trap server |
| 241 | incident manager |
| 250 | deceptive agent |
| 251 | hook manager |
| 252 | deceptive content provider |
| 253 | authenticator |

Elements numbered in the 1000's are operations of flow charts.

DETAILED DESCRIPTION

Embodiments of the present invention overcome drawbacks of conventional honeypot solutions by generating deceptive data that is only visible to an attacker. As such, legitimate user activity is unaffected by the deceptive data. Furthermore, there is a very high likelihood that triggering of deceptive data is done by an attacker, thus minimizing false positives.

Figure 5:
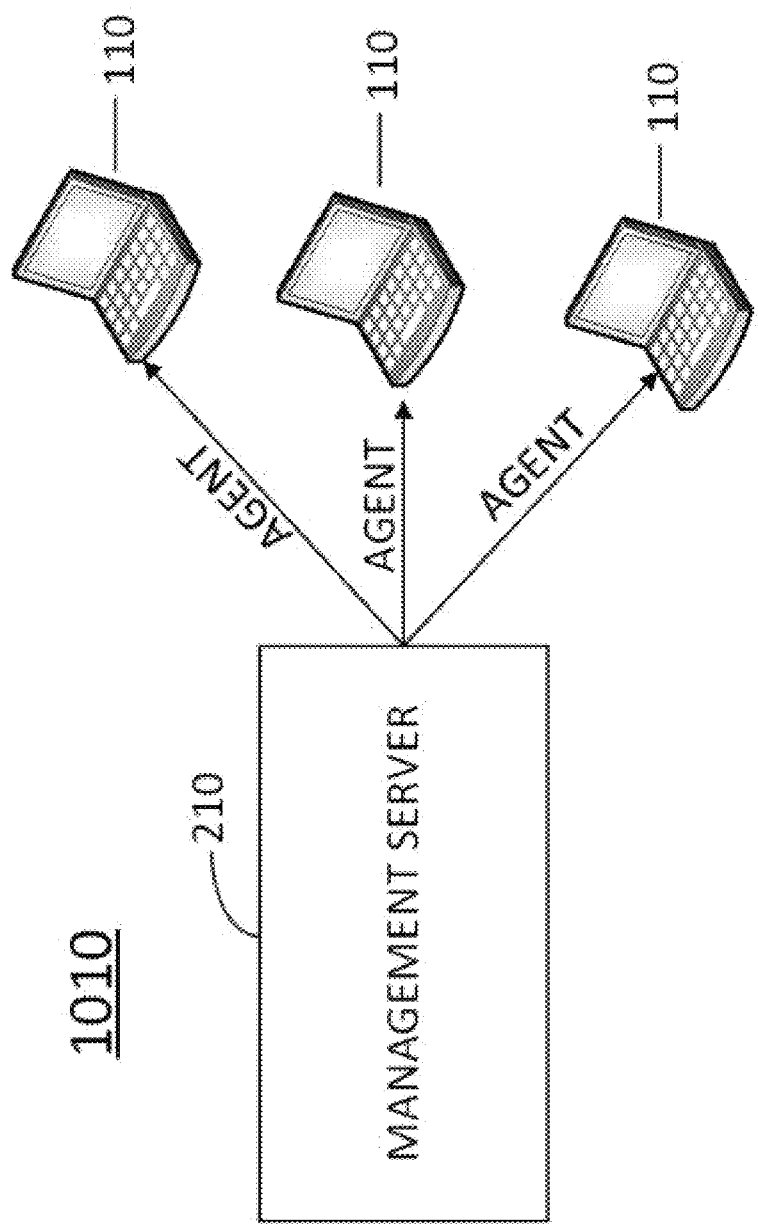
FIG. 5 is a simplified diagram of operation 1010 of the method of FIG. 4, in accordance with an embodiment of the present invention.
Figure 6:
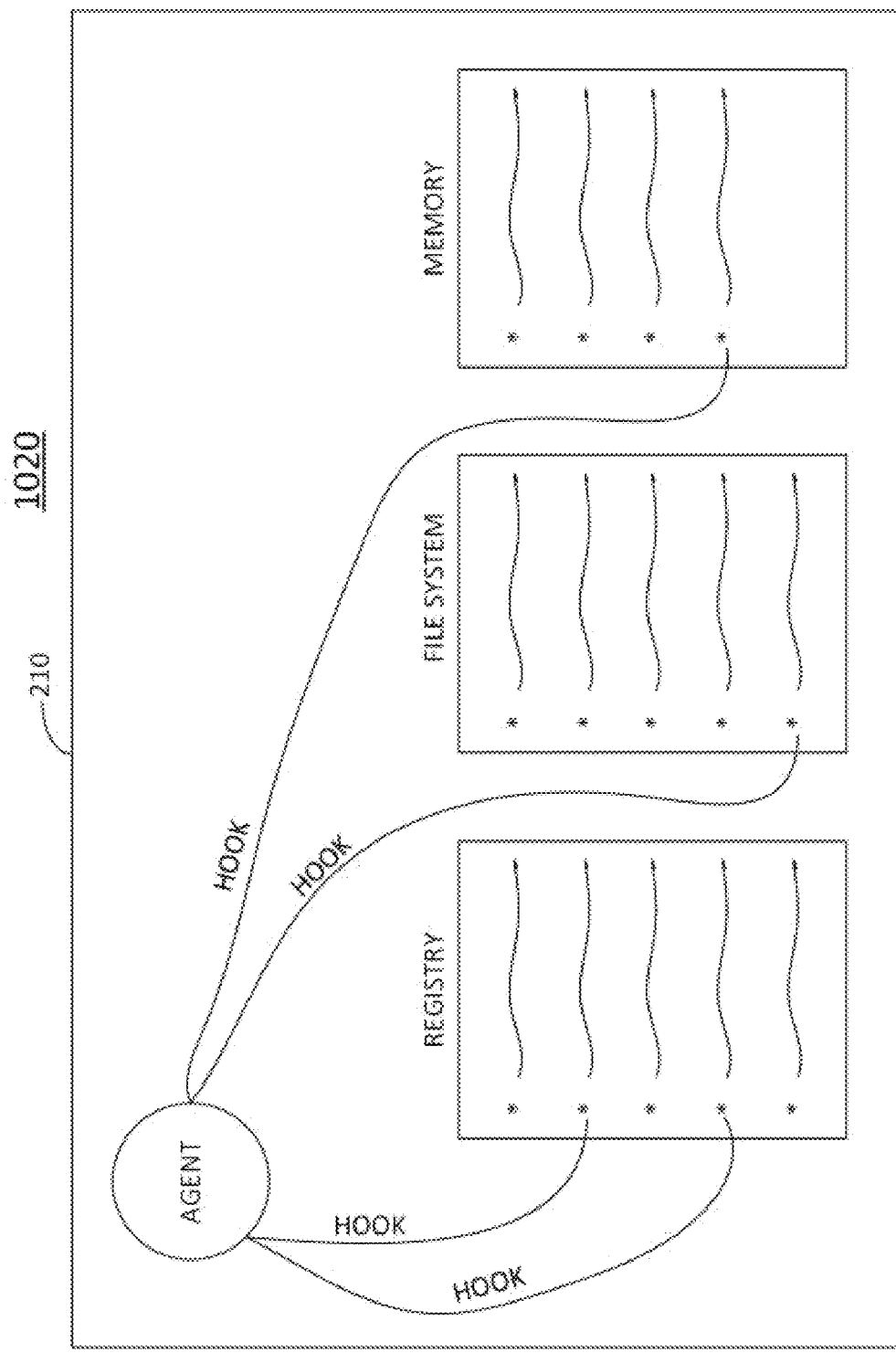
FIG. 6 is a simplified diagram of operation 1020 of the method of FIG. 4, in accordance with an embodiment of the present invention.
Figure 7:
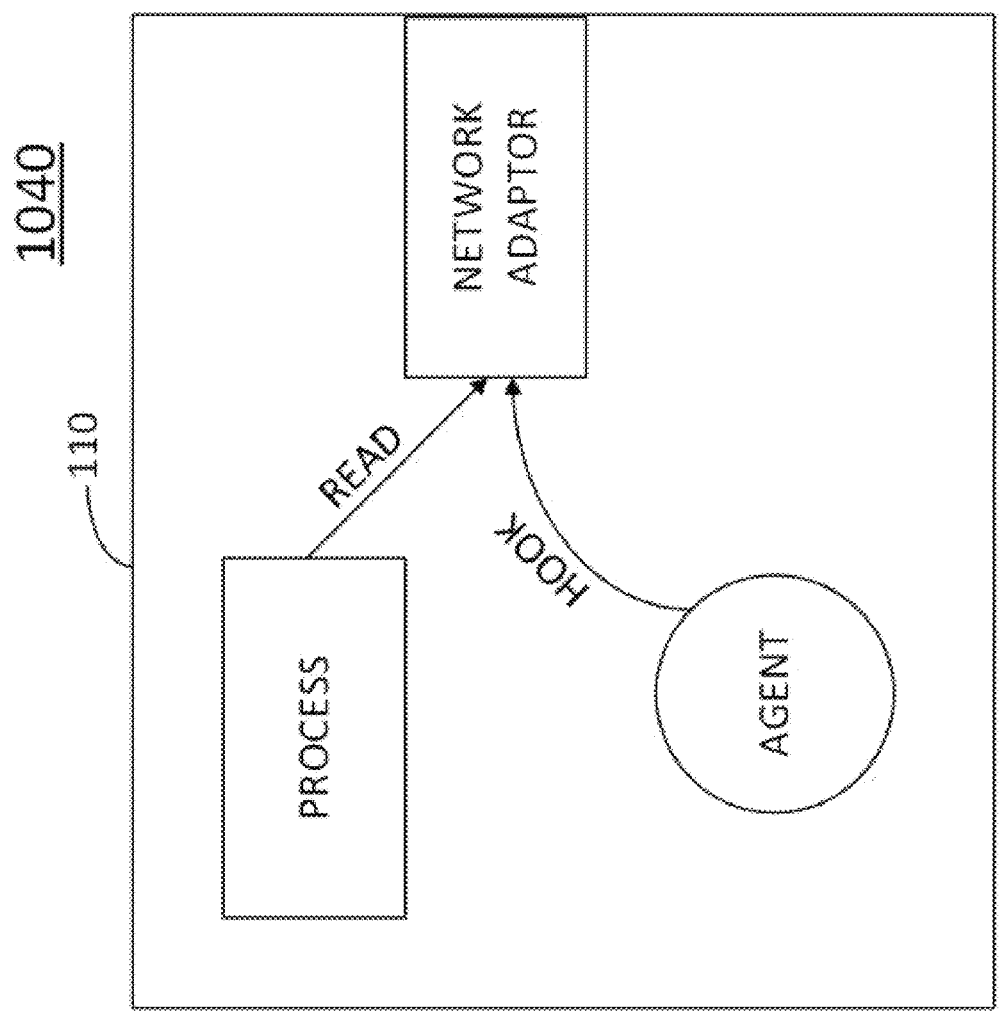
FIG. 7 is a simplified diagram of operation 1040 of the method of FIG. 4, in accordance with an embodiment of the present invention.
Figure 8:
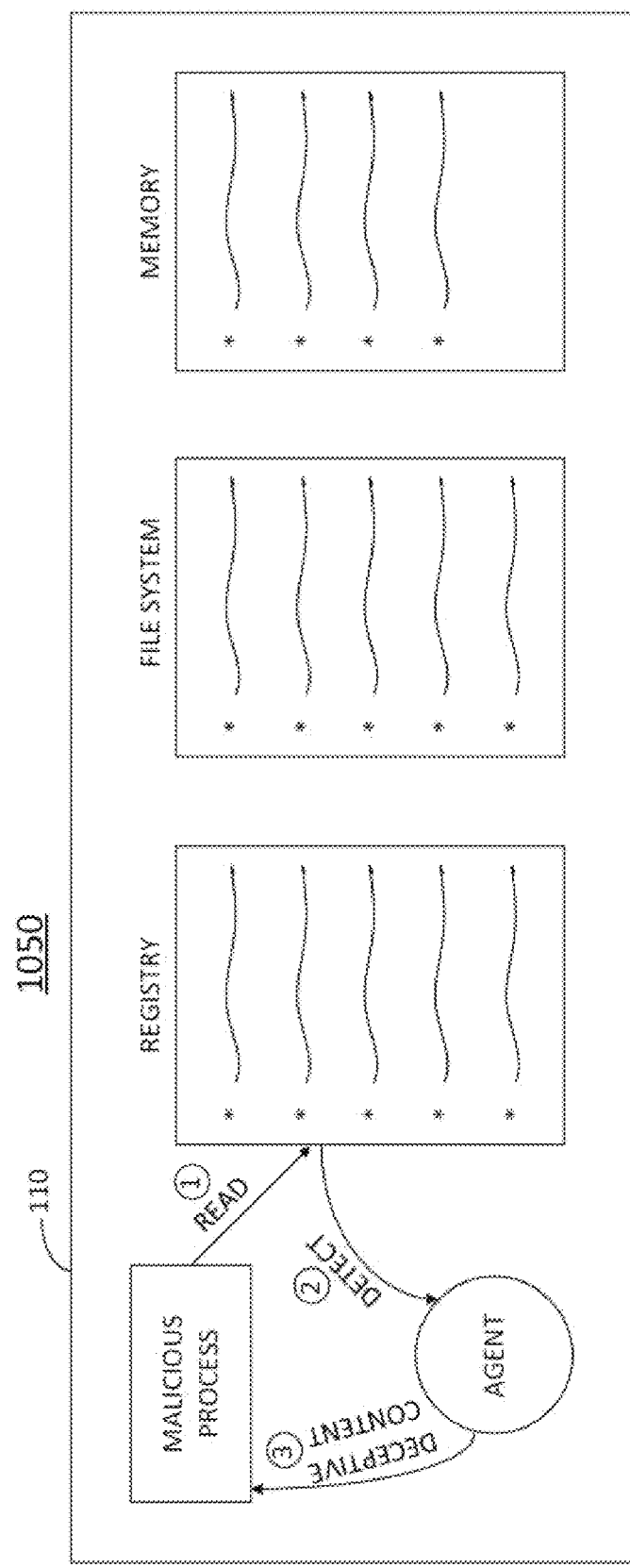
FIGS. 8 and 9 are simplified diagrams of operation 1050 of the method of FIG. 4, in accordance with an embodiment of the present invention.
Figure 9:
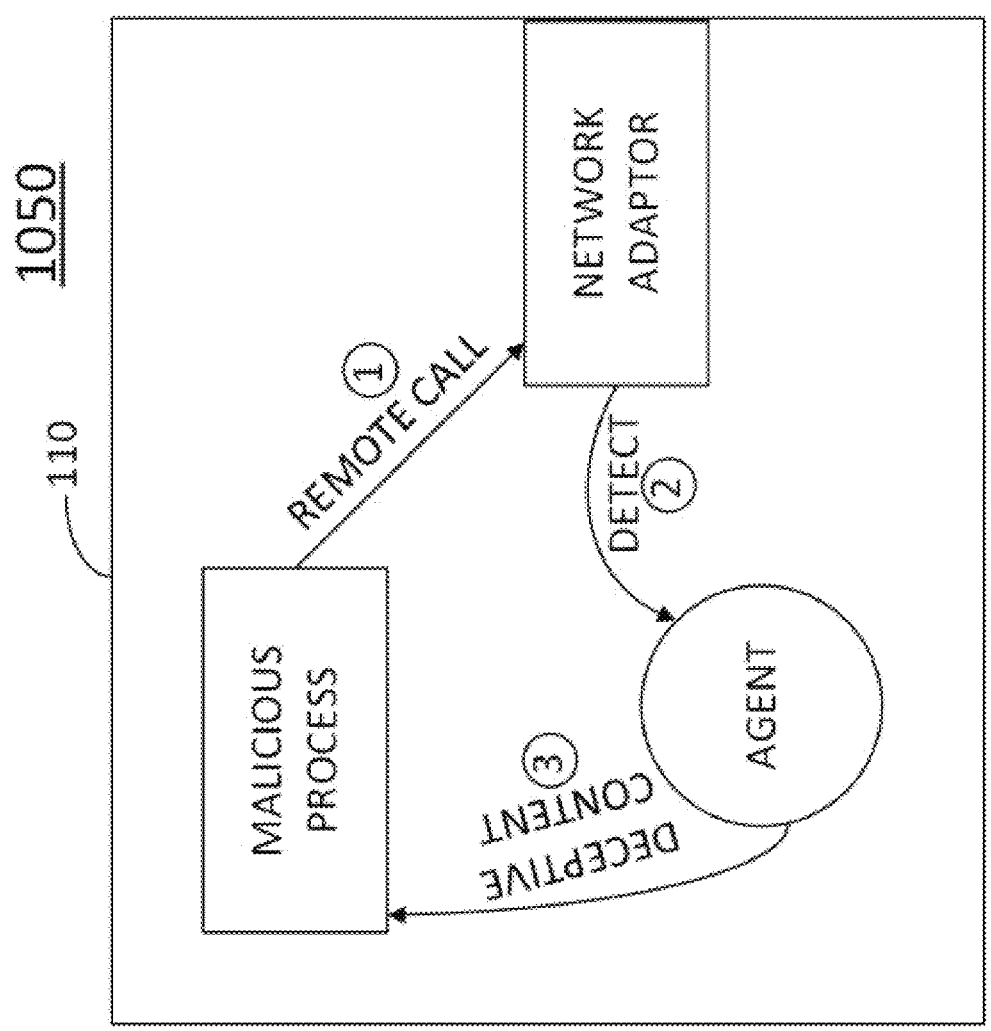
Figure 11:
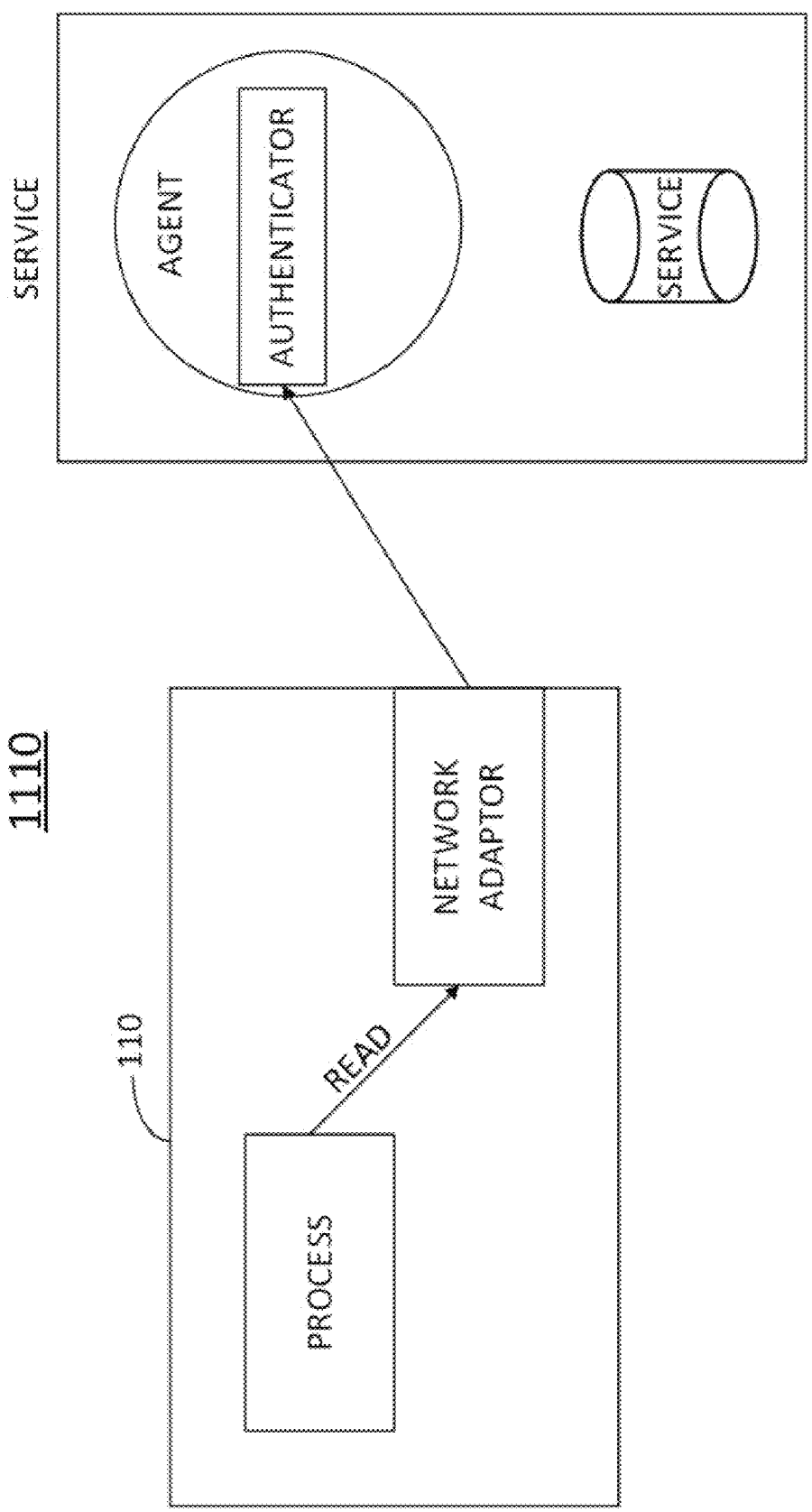
FIG. 11 is a simplified diagram of operation 1110 of the method of FIG. 10, in accordance with an embodiment of the present invention.
Figure 12:
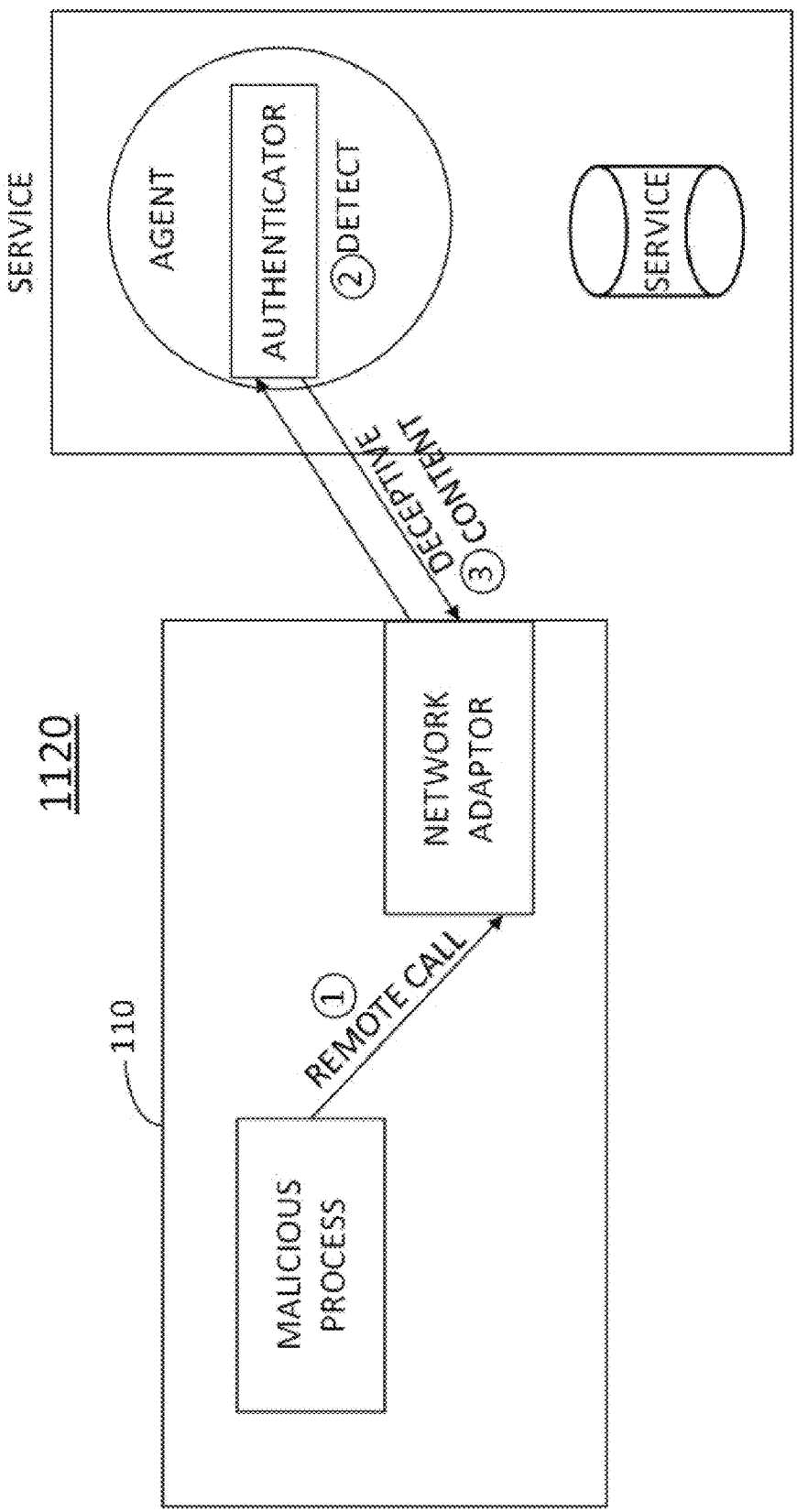
FIG. 12 is a simplified diagram of operation 1120 of the method of FIG. 10, in accordance with an embodiment of the present invention.

Inter alia, embodiments of the present invention address two cases in which attackers attempt to harvest data; namely, (1) locally via files, memory and registry, and (2) remotely from other servers including Active Directory, from authentication servers, and from cloud providers such as Amazon Web Services. Some embodiments of the present invention address case (1) by installing agents in network endpoint computers that hook to local resources (FIGS. 5, 6 and 8). Other embodiments of the present invention address case (2) by installing agents in network endpoint computers that hook network adaptors of endpoint computers (FIGS. 7 and 9). Yet other embodiments of the present invention address case (2) without use of agents in network endpoint computers (FIGS. 11 and 12).

It will be appreciated by those skilled in the art that embodiments of the present invention may be combined to address both cases (1) and (2).

Figure 1:
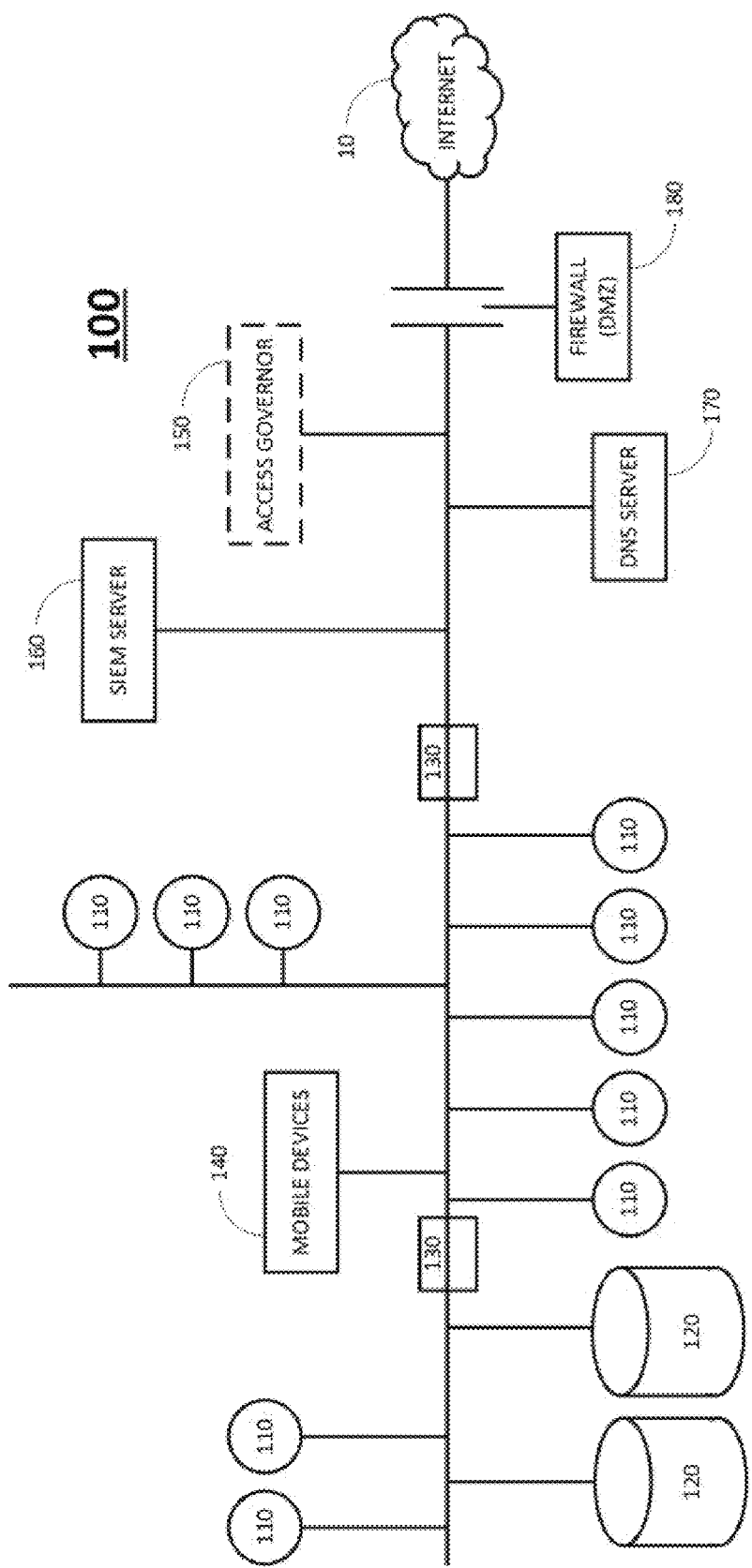
FIG. 1 is a simplified diagram of a prior art enterprise network connected to an external internet.
Figure 2:
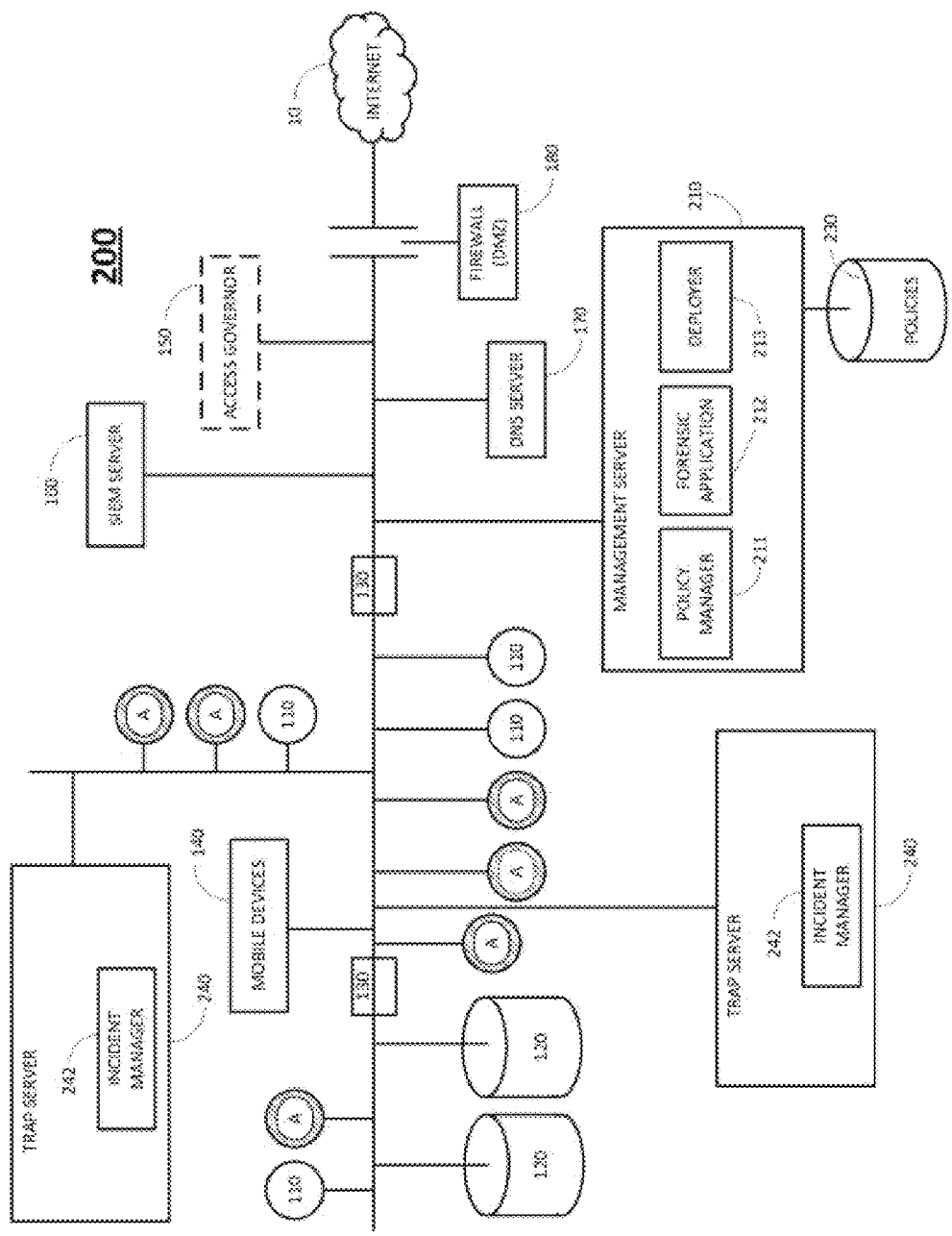
FIG. 2 is a simplified diagram of an enterprise network that deploys deceptive agents, in accordance with an embodiment of the present invention.

Reference is made to FIG. 2, which is a simplified diagram of an enterprise network that deploys deceptive agents, in accordance with an embodiment of the present invention. In addition to the conventional components of FIG. 1, FIG. 2 shows a network 200 that includes a management server 210 and a policy database 230. FIG. 2 also shows several endpoint computers 110 that have local deceptive agents 250 (shown in FIG. 3), designated A, deployed therewithin, and trap servers 240 that have incident managers 241 deployed therewithin.

Management server 210 includes a policy manager 211. Policy manager 211 defines a decoy and response policy. The decoy and response policy defines different decoy types, different decoy combinations, response procedures, notification services, and assignments of policies to specific network nodes, network users, groups of nodes or users or both. Once policies are defined, they are stored in policy database 230 with the defined assignments.

Management server 210 also includes a forensic application 212, which is a real-time application that is transmitted to an endpoint computer 110 in the network, when a deception is accessed by that endpoint computer 110, thus indicating that that endpoint computer 110 has been breached by an attacker. When forensic application 212 is launched on the endpoint computer 110, it identifies a process running within that endpoint computer 110 that accessed the deception, logs the activities performed by the thus-identified process in a forensic report, and transmits the forensic report to management server 210.

Management server 210 also includes a deployer 213 that deploys agents A in endpoint computers and in remote servers, as described hereinbelow.

Each trap server 240 includes incident manager 241, which alerts management system 210 that an attacker is accessing the trap server via an endpoint computer 110 of network 200, and causes management server 210 to send forensic application 212 to the endpoint computer 110 that is accessing trap server 240. In an alternative embodiment of the present invention, trap server 240 may store forensic application 212, in which case trap server 240 may transmit forensic application 212 directly to the endpoint computer 110 that is accessing trap server 240. In another alternative embodiment of the present invention, management server 210 or trap server 240 may transmit forensic application 212 to a destination computer other than the endpoint computer 110 that is accessing trap server 240, for collections of forensics remotely from the endpoint computer that is accessing trap server 240.

Figure 3:
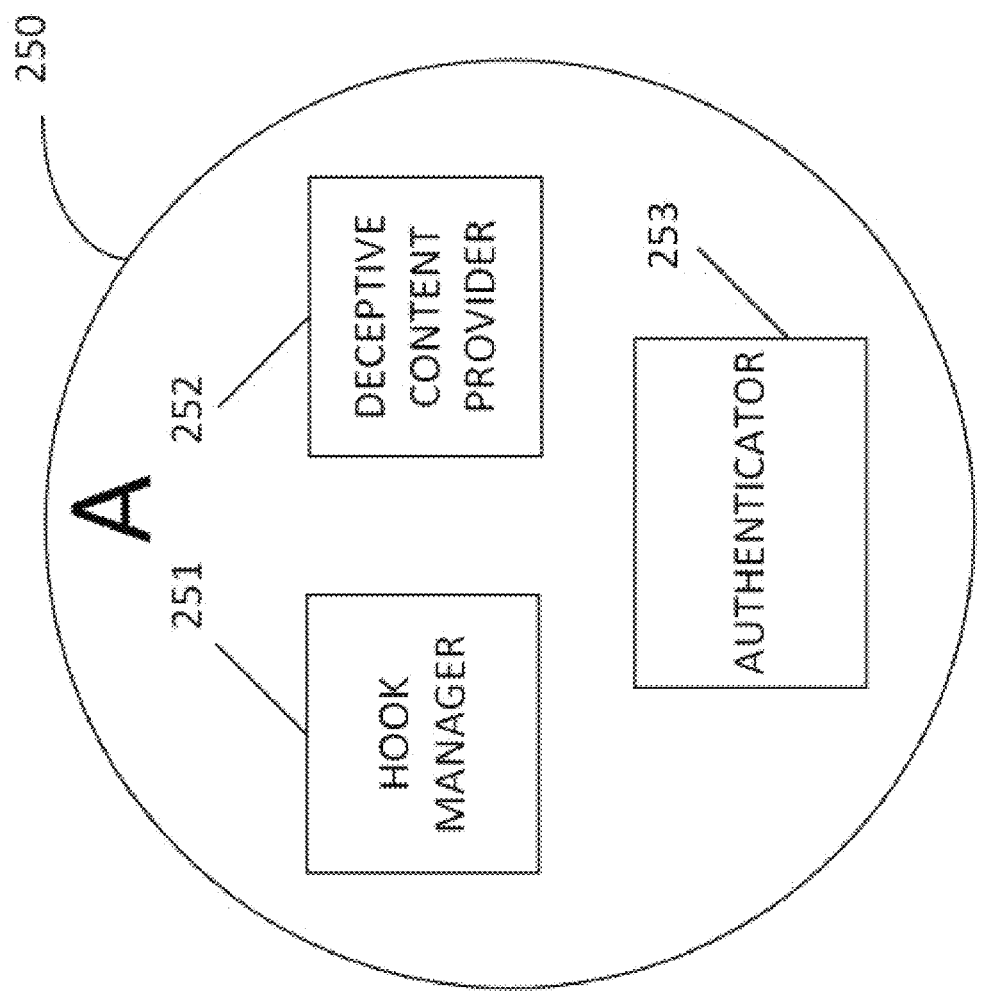
FIG. 3 is a simplified diagram of a deceptive agent module, in accordance with an embodiment of the present invention.

Reference is made to FIG. 3, which is a simplified diagram of a deceptive agent 250, also designated as A, in accordance with an embodiment of the present invention. Deceptive agent 250 includes three primary components; namely, hook manager 251, deceptive content provider 252, and authenticator 253. Hook manager 251 creates system hooks, via driver and process hooks, to resources that hold valuable credentials that would be desired by attackers, also referred to as "crown jewels", such as a registry, a file system, and a memory. Deceptive content provider 252 generates and returns deceptive content in response to a read attempt or a remote call attempt by a malicious process. Deceptive content provider 252 may identify a malicious process inter alia by consulting a whitelist of authorized processes. Deceptive content includes inter alia IP addresses, hostnames and user credentials that point to a trap server 240. Authenticator 253 authenticates inbound requests to a remote server within the enterprise, to ensure that the request comes from a legitimate client process.

Figure 4:
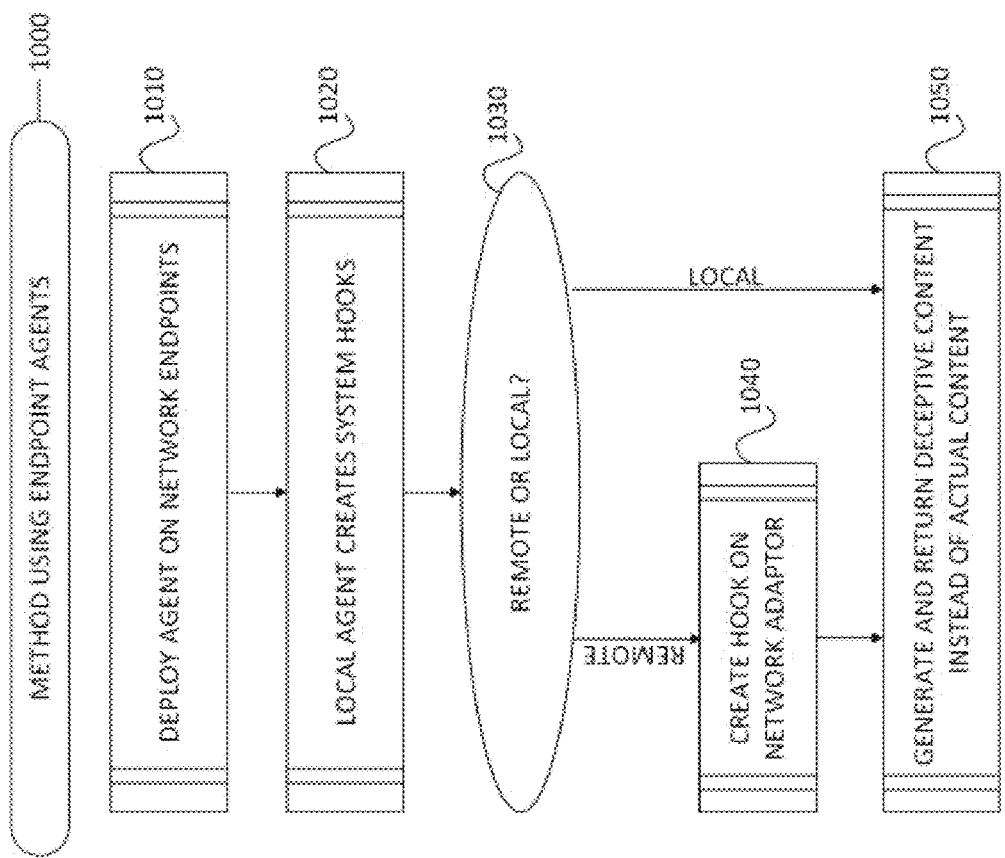
FIG. 4 is a simplified diagram of a method employing endpoint agents to plant deceptive content, in accordance with an embodiment of the present invention.

Reference is made to FIG. 4, which is a simplified diagram of a method 1000 employing endpoint agents to plant deceptive content, in accordance with an embodiment of the present invention. At operation 1010 management server 210 deploys agents on endpoint computers. Reference is made to FIG. 5, which is a simplified diagram of operation 1010, in accordance with an embodiment of the present invention. FIG. 5 shows each endpoint computer 110 receiving a local agent. Operation 1010 may be performed using common deployment methods, such as psexec and TANIUM®. Tanium is developed and sold by Tanium, Inc. of Berkeley, Calif.

At operation 1020 each local agent creates system hooks at network resources that hold desired credentials, also referred to as "crown jewels". The hooks are created via driver and process hooks. Reference is made to FIG. 6, which is a simplified diagram of operation 1020, in accordance with an embodiment of the present invention. FIG. 6 shows hooks at network resources that include a registry, a file system and a memory.

At operation 1030 a determination is made, for each endpoint computer 110, whether protection for remote servers is desired. If the determination is affirmative, then at operation 1040 the local agent for endpoint computer 110 creates a hook on the endpoint computer's network adapter. Using the hook, the local agent sees each outbound request. Reference is made to FIG. 7, which is a simplified diagram of operation 1040, in accordance with an embodiment of the present invention.

At operation 1050 in response to a malicious process attempting to read from a network resource that holds crown jewels, the local agent detects the attempted read and returns deceptive content. Reference is made to FIGS. 8 and 9, which are simplified diagrams of operation 1050, in accordance with an embodiment of the present invention. FIG. 8 shows the "(1) attempted read, (2) detect, and (3) return deceptive content" cycle for a local implementation. It is noted that the response to the read attempt comes from the agent instead of the network resource, such as the registry. FIG. 9 shows the "(1) attempted remote call, (2) detect, and (3) return deceptive content" cycle for a remote implementation.

Identification of a malicious process by the local agent at operation 1050 may be performed by whitelisting authorized processes.

Figure 10:
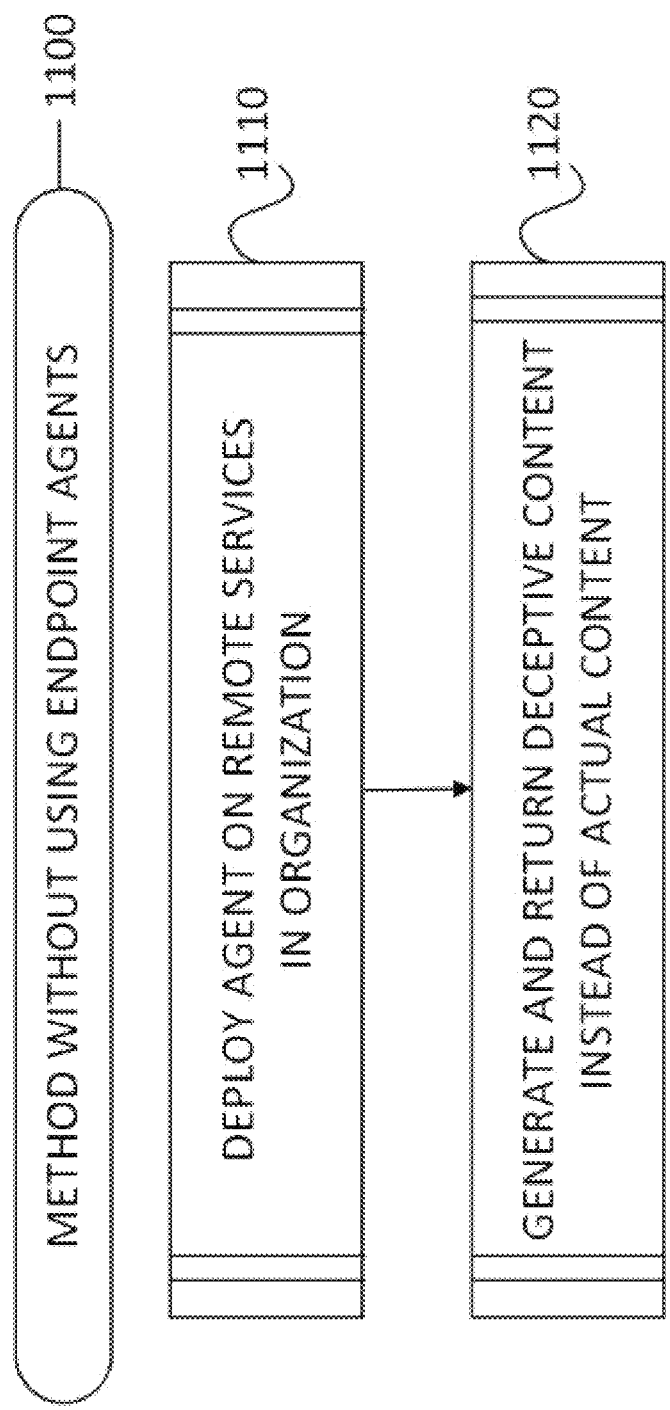
FIG. 10 is a simplified flowchart of a method for planting deceptive content without use of endpoint agents, in accordance with an embodiment of the present invention.

Reference is made to FIG. 10, which is a simplified flowchart of a method 1100 for planting deceptive content without use of endpoint agents, in accordance with an embodiment of the present invention. At operation 1110 management server 210 deploys agents on remote servers in the organization. Reference is made to FIG. 11, which is a simplified diagram of operation 1110, in accordance with an embodiment of the present invention. The agent listens to inbound requests and authenticates them to ensure that they come from a legitimate client process.

At operation 1120, in response to a malicious process making a remote call to a remote service, the agent generates and returns deceptive content, instead of actual content. Reference is made to FIG. 12, which is a simplified diagram of operation 1120, in accordance with an embodiment of the present invention. FIG. 12 shows the "(1) attempted remote call, (2) detect, and (3) return deceptive content" cycle for a remote service.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for deceiving an attacker who harvests credentials within an enterprise network, comprising a management server deploying a deceptive agent on an endpoint computer of the enterprise network, the deceptive agent comprising:
- a hook manager creating a system hook on a network adaptor of the endpoint computer; and
- a deceptive content provider, generating deceptive content and responding to an outgoing call to a service of a remote server of the enterprise network made by a malicious process run by an attacker on the endpoint computer, returning the deceptive content to the malicious process, thus making it appear to the attacker that a response is coming from the service in the remote server whereas in fact the response is coming from the deceptive agent, when said hook manager hooks the remote call.

2. The system of claim 1 wherein said hook manager creates system hooks on resources in the endpoint computer that hold valuable credentials, which would be desired by attackers, and wherein said deceptive content provider generates deceptive content and returns the deceptive content to a malicious process run by the attacker on the endpoint computer, the malicious process making a read request directed to a resource in the endpoint computer that holds valuable credentials, thus making it appear to the attacker that the response is coming from the resource whereas in fact the response is coming from the deceptive agent, when said hook manager hooks the read request.

3. The system of claim 2 wherein the resource that holds desirable credentials is a registry, a file server, or a memory in the endpoint computer.

4. The system of claim 1 wherein said management server deploys the deceptive agent on the remote server, wherein said deceptive agent further comprises an authenticator, listening to inbound requests to the remote server and authenticating the inbound requests as coming from the endpoint computer of the enterprise network, and wherein said deceptive agent generates deceptive content and responds to a remote call to a service of the remote server from a malicious process being run by the attacker on the endpoint computer by returning the deceptive content to the malicious process, thus making it appear to the attacker that the response is coming from the service of the remote server whereas in fact the response is coming from said deceptive agent, when said authenticator detects the remote call.

5. A method for deceiving an attacker who is harvesting credentials within an enterprise network, comprising:
- deploying, by a management server, a deceptive agent on an endpoint computer of an enterprise network;
- creating, by the deceptive agent, a system hook on a network adaptor of the endpoint computer; and
- in response to hooking an outbound call to a service of a remote server in the enterprise network, by a malicious process being run by an attacker on the endpoint computer, generate, by the deceptive agent, deceptive content and respond to the remote call by returning the deceptive content to the malicious process, thus making it appear to the attacker that the response is coming from the remote server whereas in fact the response is coming from the deceptive agent.

6. The method of claim 5 further comprising:
- creating, by the deceptive agent, system hooks on resources in the endpoint computer that hold valuable credentials, which would be desired by attackers; and
- in response to hooking a read request by the malicious process, directed to a resource in the endpoint computer that holds valuable credentials, generate, by the deceptive agent, deceptive content and respond to the read request by returning the deceptive content to the malicious process, thus making it appear to the attacker that the response is coming from the resource whereas in fact the response is coming from the deceptive agent.

7. The method of claim 6 wherein the hooked read request is directed to a registry, a file server, or a memory in the endpoint computer.

8. A method for deceiving an attacker who is harvesting credentials within an enterprise network, comprising:
- deploying, by a management server, a deceptive agent on a remote server of an enterprise network, wherein the deceptive agent listens to inbound requests for the remote server and authenticates the inbound requests as coming from a legitimate process running on a client computer of the enterprise network; and
- in response to detecting a remote call to a service of the remote server from a malicious process being run by an attacker on a client computer of the enterprise network, generate, by the deceptive agent, deceptive content and respond to the remote call by returning the deceptive content to the malicious process, thus making it appear to the attacker that the response is coming from the service in the remote server whereas in fact the response is coming from the deceptive agent.

9. A system for deceiving an attacker who harvests credentials within an enterprise network, comprising a management server deploying a deceptive agent on a remote server of the enterprise network, the deceptive agent comprising:
- an authenticator, listening to inbound requests to the remote server and authenticating the inbound requests as coming from a legitimate process running on a client computer of the enterprise network; and
- a deceptive content provider, generating deceptive content and responding to a remote call to a service of the remote server from a malicious process being run by an attacker on the client computer by returning the deceptive content to the malicious process, thus making it appear to the attacker that the response is coming from the service of the remote server whereas in fact the response is coming from said deceptive agent, when said authenticator detects the remote call.

\* \* \* \* \*